US011283697B1

(12) United States Patent
Rajagopalan et al.

(10) Patent No.: US 11,283,697 B1
(45) Date of Patent: Mar. 22, 2022

(54) SCALABLE REAL TIME METRICS MANAGEMENT

(71) Applicant: VMware, Inc., Palo Alto, CA (US)

(72) Inventors: Ranganathan Rajagopalan, Fremont, CA (US); Gaurav Rastogi, San Francisco, CA (US); Praveen Yalagandula, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 1215 days.

(21) Appl. No.: 15/055,450

(22) Filed: Feb. 26, 2016

Related U.S. Application Data

(60) Provisional application No. 62/137,625, filed on Mar. 24, 2015.

(51) Int. Cl.

| | |
|---|---|
| ***H04L 12/26*** | (2006.01) |
| ***H04L 43/08*** | (2022.01) |
| ***G06F 16/2458*** | (2019.01) |
| ***G06F 16/9535*** | (2019.01) |

(52) U.S. Cl.
CPC .......... *H04L 43/08* (2013.01); *G06F 16/2477* (2019.01); *G06F 16/9535* (2019.01)

(58) Field of Classification Search
None
See application file for complete search history.

(56) References Cited

U.S. PATENT DOCUMENTS 5,109,486 A 4/1992 Seymour
5,781,703 A 7/1998 Desai et al.
6,148,335 A 11/2000 Haggard et al.
6,449,739 B1 9/2002 Landan
6,515,968 B1 2/2003 Combar et al.
6,714,979 B1 3/2004 Brandt et al.
6,750,897 B1 6/2004 Moshrefi et al.
6,792,458 B1 9/2004 Muret et al.
6,792,460 B2 9/2004 Oulu et al.
6,901,051 B1 5/2005 Hou et al.
6,976,090 B2 12/2005 Ben-Shaul et al.
(Continued)

FOREIGN PATENT DOCUMENTS

WO 2020086956 A1 4/2020

OTHER PUBLICATIONS

Al-Fares, Mohammed, et al., "Hedera: Dynamic Flow Scheduling for Data Center Networks," 7th USENIX Symposium on Networked Systems Design and Implementation (NSDI 2010), Apr. 28-30, 2010, 15 pages, San Jose, CA, USA.
(Continued)

*Primary Examiner* — Ashish Thomas
*Assistant Examiner* — Mellissa M. Ohba
(74) *Attorney, Agent, or Firm* — Adeli LLP

(57) ABSTRACT

Managing performance metrics includes: obtaining a plurality of performance metrics associated with a plurality of sources on a network; aggregating, at a first rate, the plurality of performance metrics associated with the plurality of sources to generate a plurality of first aggregated results; maintaining at least some of the plurality of first aggregated results in one or more memories; aggregating, at a second rate, the plurality of first aggregated results to generate a plurality of second aggregated results, the second rate being a lower rate than the first rate; and maintaining at least some of the plurality of second aggregated results in the one or more memories.

20 Claims, 9 Drawing Sheets

(56) References Cited

U.S. PATENT DOCUMENTS 6,996,778 B2 2/2006 Rajarajan et al.
7,076,695 B2 * 7/2006 McGee ............... G06F 11/0709 702/179
7,130,812 B1 * 10/2006 Iyer ..................... G06F 17/3051 705/7.11
7,246,159 B2 7/2007 Aggarwal et al.
7,353,272 B2 4/2008 Robertson et al.
7,430,610 B2 9/2008 Pace et al.
7,636,708 B2 * 12/2009 Garcea ................ G06F 11/3447
7,701,852 B1 4/2010 Hohn et al.
7,743,380 B2 * 6/2010 Seidman ............. G06F 11/3616 718/105
7,817,549 B1 10/2010 Kasralikar et al.
7,924,739 B2 4/2011 Sen et al.
7,933,988 B2 4/2011 Nasuto et al.
7,940,766 B2 5/2011 Olakangil et al.
7,983,270 B2 7/2011 Wong
7,990,847 B1 8/2011 Leroy et al.
8,018,852 B2 9/2011 Olakangil et al.
8,032,896 B1 10/2011 Li et al.
8,103,750 B2 1/2012 O'Neal et al.
8,112,471 B2 2/2012 Wei et al.
8,131,712 B1 3/2012 Thambidorai et al.
8,412,493 B2 * 4/2013 Duchenay ............. G06F 16/283 703/2
8,462,774 B2 6/2013 Page et al.
8,499,066 B1 7/2013 Zhang et al.
8,499,093 B2 7/2013 Grosser et al.
8,588,069 B2 11/2013 Todd et al.
8,611,251 B2 12/2013 Subramanian et al.
8,630,297 B2 1/2014 Subramanian et al.
8,671,407 B2 3/2014 Ballani et al.
8,755,283 B2 6/2014 Patel et al.
8,812,727 B1 8/2014 Sorenson et al.
8,856,797 B1 10/2014 Siddiqui et al.
8,874,725 B1 10/2014 Ganjam et al.
8,964,571 B2 2/2015 Chaudhry et al.
8,972,602 B2 3/2015 Mithyantha
8,977,728 B1 3/2015 Martini
8,989,189 B2 3/2015 Zhang et al.
9,032,078 B2 5/2015 Beerse et al.
9,047,648 B1 6/2015 Lekutai et al.
9,071,537 B2 6/2015 Talla et al.
9,083,642 B2 7/2015 Janardhanan
9,083,710 B1 7/2015 Yadav
9,210,056 B1 12/2015 Choudhary et al.
9,288,193 B1 3/2016 Gryb et al.
9,300,552 B2 3/2016 Dube et al.
9,329,915 B1 5/2016 Chandrasekharapuram et al.
9,419,889 B2 8/2016 Xiao et al.
9,459,980 B1 10/2016 Arguelles
9,467,476 B1 10/2016 Shieh et al.
9,477,784 B1 * 10/2016 Bhave ................. G06F 11/3476
9,483,286 B2 11/2016 Basavaiah
9,495,222 B1 * 11/2016 Jackson .................... G06F 9/52
9,509,614 B2 11/2016 Bosch et al.
9,519,500 B2 12/2016 Ballani et al.
9,531,614 B1 12/2016 Nataraj et al.
9,558,465 B1 1/2017 Arguelles et al.
9,571,516 B1 2/2017 Curcic et al.
9,584,421 B2 2/2017 Rai et al.
9,608,880 B1 3/2017 Goodall
9,613,120 B1 4/2017 Kharatishvili et al.
9,626,275 B1 * 4/2017 Hitchcock ........... G06F 11/3006
9,674,302 B1 6/2017 Khalid et al.
9,680,699 B2 6/2017 Cohen et al.
9,692,811 B1 6/2017 Tajuddin et al.
9,697,316 B1 7/2017 Taylor et al.
9,712,410 B1 7/2017 Char et al.
9,716,617 B1 7/2017 Ahuja et al.
9,729,414 B1 8/2017 Oliveira et al.
9,749,888 B1 8/2017 Colwell et al.
9,830,192 B1 * 11/2017 Crouchman ........ G06F 9/45558
9,843,520 B1 12/2017 Haltore et al.
9,882,830 B2 1/2018 Taylor et al.
9,935,829 B1 4/2018 Miller et al.
9,967,275 B1 5/2018 Kolman et al.
10,003,550 B1 6/2018 Babcock et al.
10,091,093 B2 10/2018 Luo et al.
10,110,684 B1 10/2018 Haltore et al.
10,127,097 B2 11/2018 Talla et al.
10,212,041 B1 2/2019 Rastogi et al.
10,225,194 B2 3/2019 Haltore et al.
10,313,211 B1 6/2019 Rastogi et al.
10,372,600 B2 * 8/2019 Mathur ................... G06F 11/32
10,547,521 B1 1/2020 Roy et al.
10,594,562 B1 3/2020 Rastogi et al.
10,630,543 B1 4/2020 Wei et al.
10,693,734 B2 6/2020 Rastogi et al.
10,728,121 B1 7/2020 Chitalia et al.
10,873,541 B2 12/2020 Callau et al.
2001/0023453 A1 9/2001 Sundqvist
2002/0078150 A1 6/2002 Thompson et al.
2002/0198984 A1 12/2002 Goldstein et al.
2002/0198985 A1 12/2002 Fraenkel et al.
2003/0069993 A1 4/2003 Na et al.
2003/0191837 A1 10/2003 Chen
2003/0236877 A1 12/2003 Allan
2004/0054680 A1 * 3/2004 Kelley .................. H04L 41/046
2004/0064552 A1 4/2004 Chong et al.
2004/0103186 A1 5/2004 Casati et al.
2004/0243607 A1 * 12/2004 Tummalapalli ..... H04L 41/5009
2005/0010578 A1 1/2005 Doshi
2005/0060574 A1 3/2005 Klotz et al.
2005/0108444 A1 5/2005 Flauaus et al.
2005/0120160 A1 6/2005 Plouffe et al.
2005/0172018 A1 8/2005 Devine et al.
2005/0188221 A1 8/2005 Motsinger et al.
2005/0239444 A1 10/2005 Shieh
2006/0167939 A1 7/2006 Seidman et al.
2006/0209818 A1 9/2006 Purser
2006/0242282 A1 10/2006 Mullarkey
2006/0271677 A1 11/2006 Mercier
2007/0226554 A1 * 9/2007 Greaves .............. G06F 11/3003 714/724
2008/0080517 A1 4/2008 Roy et al.
2008/0101233 A1 5/2008 Shi et al.
2008/0104230 A1 5/2008 Nasuto et al.
2008/0126534 A1 5/2008 Mueller et al.
2008/0137660 A1 6/2008 Olakangil et al.
2009/0010257 A1 1/2009 Chaudhry et al.
2009/0049524 A1 2/2009 Farrell et al.
2009/0154366 A1 * 6/2009 Rossi ...................... H04L 41/12 370/252
2009/0199196 A1 * 8/2009 Peracha .............. G06F 11/3409 718/104
2009/0276771 A1 11/2009 Nickolov et al.
2010/0002606 A1 1/2010 Preis et al.
2010/0036903 A1 2/2010 Ahmad et al.
2010/0046515 A1 2/2010 Wong
2010/0157840 A1 6/2010 Sen et al.
2010/0162036 A1 6/2010 Linden et al.
2010/0268764 A1 10/2010 Wee et al.
2010/0279622 A1 11/2010 Shuman et al.
2010/0287171 A1 11/2010 Schneider
2010/0287262 A1 11/2010 Elzur
2011/0126111 A1 5/2011 Gill et al.
2011/0185082 A1 7/2011 Thompson
2011/0196890 A1 8/2011 Pfeifle et al.
2011/0211579 A1 9/2011 Cao et al.
2011/0261812 A1 10/2011 Kini et al.
2011/0283013 A1 11/2011 Grosser et al.
2012/0033672 A1 2/2012 Page et al.
2012/0066371 A1 3/2012 Patel et al.
2012/0101800 A1 4/2012 Miao et al.
2012/0106347 A1 5/2012 Allan et al.
2012/0110185 A1 5/2012 Ganesan et al.
2012/0131591 A1 5/2012 Moorthi et al.
2012/0155266 A1 6/2012 Patel et al.
2012/0155468 A1 6/2012 Greenberg et al.
2012/0201252 A1 8/2012 Subramanian et al.
2012/0254443 A1 10/2012 Ueda
2012/0254444 A1 10/2012 Harchol-Balter et al.
2012/0291099 A1 11/2012 Grube et al.

(56) References Cited

U.S. PATENT DOCUMENTS

2013/0013953 A1 1/2013 Eck et al.
2013/0014101 A1 1/2013 Ballani et al.
2013/0044757 A1 2/2013 Rai et al.
2013/0086230 A1 4/2013 Guerra et al.
2013/0086273 A1 4/2013 Wray et al.
2013/0103827 A1 4/2013 Dunlap et al.
2013/0155902 A1 6/2013 Feng et al.
2013/0179289 A1 7/2013 Calder et al.
2013/0179881 A1 7/2013 Calder et al.
2013/0179894 A1 7/2013 Calder et al.
2013/0179895 A1 7/2013 Calder et al.
2013/0211559 A1 8/2013 Lawson et al.
2013/0212257 A1 8/2013 Murase et al.
2013/0227165 A1 8/2013 Liu
2013/0286846 A1 10/2013 Atlas et al.
2013/0290538 A1 10/2013 Gmach et al.
2013/0301640 A9 11/2013 Subramanian et al.
2013/0308455 A1 11/2013 Kapadia et al.
2013/0329730 A1 12/2013 Zhang et al.
2013/0339544 A1 12/2013 Mithyantha
2013/0343213 A1* 12/2013 Reynolds .............. H04L 43/045 370/252
2013/0343386 A1 12/2013 Sankar et al.
2013/0346572 A1 12/2013 Jain et al.
2013/0346594 A1* 12/2013 Banerjee ............. G06F 11/3495 709/224
2014/0006862 A1 1/2014 Jain et al.
2014/0025770 A1 1/2014 Warfield et al.
2014/0029618 A1 1/2014 Janardhanan
2014/0089500 A1 3/2014 Sankar et al.
2014/0126376 A1 5/2014 Rai et al.
2014/0143406 A1* 5/2014 Malhotra ............ G06F 11/3409 709/224
2014/0157274 A1 6/2014 Ballani et al.
2014/0173675 A1 6/2014 Ahmed et al.
2014/0185446 A1 7/2014 Patel et al.
2014/0215058 A1 7/2014 Vicat-Blanc et al.
2014/0215621 A1 7/2014 Xaypanya et al.
2014/0229706 A1 8/2014 Kuesel et al.
2014/0280886 A1* 9/2014 Burns ..................... H04L 43/04 709/224
2014/0282160 A1 9/2014 Zarpas
2014/0304414 A1 10/2014 Yengalasetti et al.
2014/0310391 A1 10/2014 Sorenson et al.
2014/0344439 A1 11/2014 Kempf et al.
2014/0351226 A1 11/2014 Christodorescu et al.
2014/0355563 A1 12/2014 Sane et al.
2014/0369204 A1 12/2014 Anand et al.
2014/0379938 A1 12/2014 Bosch et al.
2015/0023352 A1 1/2015 Yang et al.
2015/0058265 A1 2/2015 Padala et al.
2015/0074679 A1 3/2015 Fenoglio et al.
2015/0078152 A1 3/2015 Garg et al.
2015/0081880 A1 3/2015 Eaton et al.
2015/0106523 A1 4/2015 Cui et al.
2015/0124640 A1 5/2015 Chu et al.
2015/0134831 A1 5/2015 Hiroishi
2015/0163144 A1 6/2015 Koponen et al.
2015/0199219 A1 7/2015 Kim et al.
2015/0212829 A1* 7/2015 Kupershtok .......... G06F 15/177 713/1
2015/0256448 A1 9/2015 Xiao et al.
2015/0278061 A1 10/2015 Siciliano et al.
2015/0288682 A1 10/2015 Bisroev et al.
2015/0293954 A1* 10/2015 Hsiao ................ G06F 17/30312 715/738
2015/0295780 A1 10/2015 Hsiao et al.
2015/0295796 A1 10/2015 Hsiao et al.
2015/0358391 A1 12/2015 Moon et al.
2015/0370852 A1* 12/2015 Shastry ................. G06F 16/283 707/722
2015/0381484 A1 12/2015 Hira et al.
2016/0064277 A1 3/2016 Park et al.
2016/0065479 A1 3/2016 Harper et al.
2016/0087879 A1 3/2016 Matsubara et al.
2016/0094410 A1 3/2016 Anwar et al.
2016/0094431 A1 3/2016 Hall et al.
2016/0094483 A1 3/2016 Johnston et al.
2016/0105335 A1 4/2016 Choudhary et al.
2016/0127204 A1 5/2016 Ozaki et al.
2016/0149832 A1 5/2016 Liang et al.
2016/0164738 A1 6/2016 Pinski et al.
2016/0182399 A1 6/2016 Zadka et al.
2016/0191457 A1 6/2016 Torzillo et al.
2016/0217022 A1 7/2016 Velipasaoglu et al.
2016/0294722 A1 10/2016 Bhatia et al.
2016/0301608 A1 10/2016 Natarajan et al.
2016/0323377 A1 11/2016 Einkauf et al.
2016/0344633 A1 11/2016 Jiao et al.
2016/0359719 A1 12/2016 Travostino
2017/0041386 A1 2/2017 Bhat et al.
2017/0063933 A1 3/2017 Shieh et al.
2017/0093986 A1 3/2017 Kim et al.
2017/0126792 A1 5/2017 Halpern et al.
2017/0134481 A1 5/2017 DeCusatis et al.
2017/0295100 A1 10/2017 Hira et al.
2017/0324555 A1 11/2017 Wu et al.
2017/0331907 A1 11/2017 Jagannath et al.
2017/0353572 A1 12/2017 Wang
2018/0004582 A1 1/2018 Hallenstål
2018/0004693 A1 1/2018 Macnamara et al.
2018/0006928 A1 1/2018 Luo et al.
2018/0018244 A1 1/2018 Yoshimura et al.
2018/0041408 A1 2/2018 Dagum et al.
2018/0041470 A1 2/2018 Schultz et al.
2018/0046482 A1 2/2018 Karve et al.
2018/0063193 A1 3/2018 Chandrashekhar et al.
2018/0088935 A1 3/2018 Church et al.
2018/0089328 A1 3/2018 Bath et al.
2018/0097735 A1 4/2018 Haltore et al.
2018/0136931 A1 5/2018 Hendrich et al.
2018/0287902 A1 10/2018 Chitalia et al.
2018/0302770 A1 10/2018 Bhaskaran et al.
2018/0309637 A1 10/2018 Gill et al.
2018/0332124 A1 11/2018 Haltore et al.
2018/0335946 A1 11/2018 Wu et al.
2018/0367596 A1 12/2018 Bache et al.
2019/0123970 A1 4/2019 Rastogi et al.
2019/0199790 A1 6/2019 Fang et al.
2019/0297014 A1 9/2019 Azgin et al.
2020/0136939 A1 4/2020 Rastogi et al.
2020/0136942 A1 4/2020 Rastogi et al.
2020/0169479 A1 5/2020 Ireland
2020/0287794 A1 9/2020 Rastogi et al.
2021/0119923 A1 4/2021 Brown et al.

OTHER PUBLICATIONS

Curtis, Andrew R., et al., "DevoFlow: Scaling Flow Management for High-Performance Networks," SIGCOMM '11, Aug. 15-19, 2011, 12 pages, ACM.
McKeown, Nick, et al., "OpenFlow: Enabling Innovation in Campus Networks," ACM SIGCOMM Computer Communication Review, Apr. 2008, 6 pages, vol. 38, No. 2, ACM.
Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.
Author Unknown, "Autoscaling," Aug. 20, 2015, 4 pages, Amazon Web Services, retrieved from http://web.archive.org/web/20150820193921/https://aws.amazon.com/autoscaling/.
Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.
Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.
De George, Andy, "How to Scale an Application," Jun. 16, 2015, 8 pages, Github.com.

(56) References Cited

OTHER PUBLICATIONS

Liu, Feng, et al., "Monitoring of Grid Performance Based-on Agent," 2007 2nd International Conference on Pervasive Computing and Applications, Jul. 26-27, 2007, 6 pages, IEEE, Birmingham, UK.

Sevcik, Peteer, et al., "Apdex Alliance," May 24, 2014, 5 pages, www.apdex.org.

Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.

Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-bpfilter-what-are-these-things-and-what-do-they-mean-enterprise/.

* cited by examiner

Client
Client
Client
Client
Client
Client
252
Network
254
250
Network Layer
255
204
VM
VM
VM
Service Engine
OS (hypervisor)
Virtual Switch
Hardware
202
204
206
208
212
214
215
218
219
220
224
256
290
292
Controller
Metrics Manager

| MetricsObjectType =vserver_l4_client | Entity = vs-1 | Node = se-1 | ObjectID=port |
|---|---|---|---|

FIG. 3B

| Header | Metric 1 | Metric 2 | ... |
|---|---|---|---|

FIG. 3C

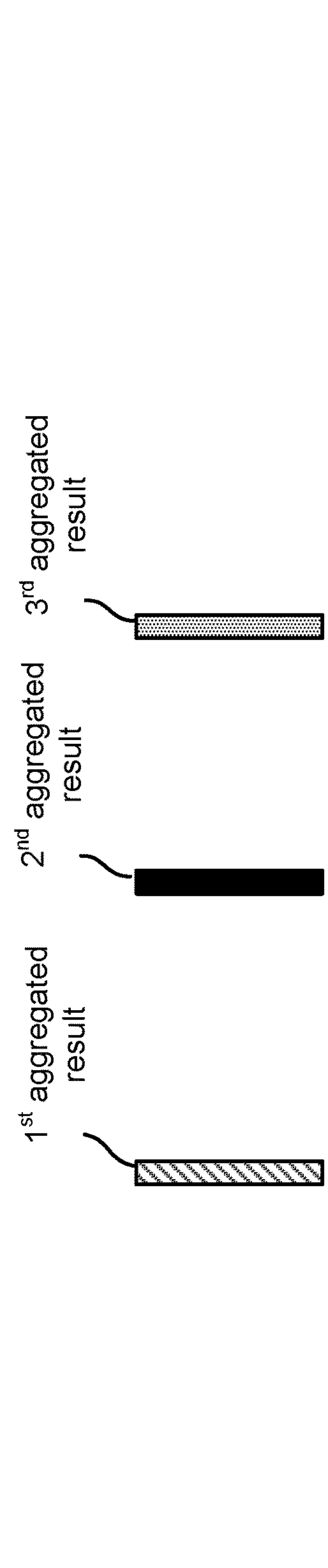
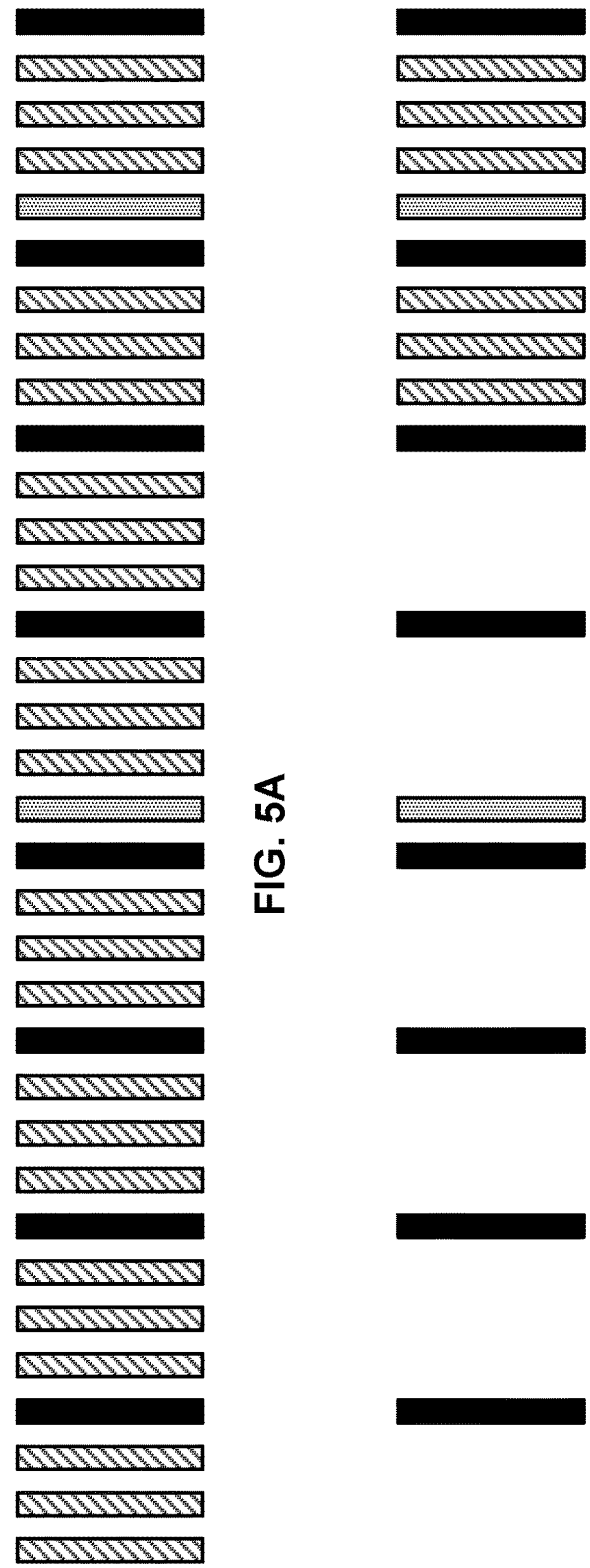
FIG. 5A
FIG. 5B

SCALABLE REAL TIME METRICS MANAGEMENT

CROSS REFERENCE TO OTHER APPLICATIONS

This application claims priority to U.S. Provisional Patent Application No. 62/137,625 entitled REAL TIME METRICS ENGINE filed Mar. 24, 2015 which is incorporated herein by reference in its entirety for all purposes.

BACKGROUND OF THE INVENTION

Metrics (also referred to as performance metrics) are used by computer systems to quantify the measurement of system performance. Metrics are critical for analyzing systems' operations and providing feedback for improvements.

In modern computer systems, the quantity of metrics can be large. For example, suppose that a single cloud application collects 1000 metrics for analysis every 5 seconds, which means that 720,000 metrics are collected every hour. In a typical high scale environment such as an enterprise data center that supports thousands of applications each executing on multiple servers, the rate can be on the order of billions of metrics per hour.

Currently, most performance monitoring tools save collected metrics to a database, then perform analysis offline. These tools tend to scale poorly because of the high number of input/output (I/O) operations (such as database reads and writes) required for storing and processing a large number of metrics. Further, these tools typically do not support real time analytics due to the latency and processing overhead in storing and processing metrics data in the database.

BRIEF DESCRIPTION OF THE DRAWINGS

Various embodiments of the invention are disclosed in the following detailed description and the accompanying drawings.

FIG. 3B is a diagram illustrating an embodiment of a metric data structure.

FIG. 3C is a diagram illustrating an embodiment of a metrics message.

FIGS. 5A-5B are diagrams illustrating an embodiment of an approach for archiving the aggregated results.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing metrics for high scale environments is disclosed. In some embodiments, the metrics are managed and processed in a pipeline comprising multiple stages. A plurality of performance metrics associated with a plurality of sources on a network is obtained. The plurality of performance metrics is aggregated at a first rate to generate a plurality of first aggregated results, and at least some of the plurality of first aggregated results are maintained for a time in one or more memories. The plurality of first aggregated results is aggregated at a second rate to generate a plurality of second aggregated results, the second rate being a lower rate than the first rate. At least some of the plurality of second aggregated results are maintained in the one or more memories. Additional aggregation stages can be used. The aggregated results can be persisted to a persistent storage.

Figure 1:
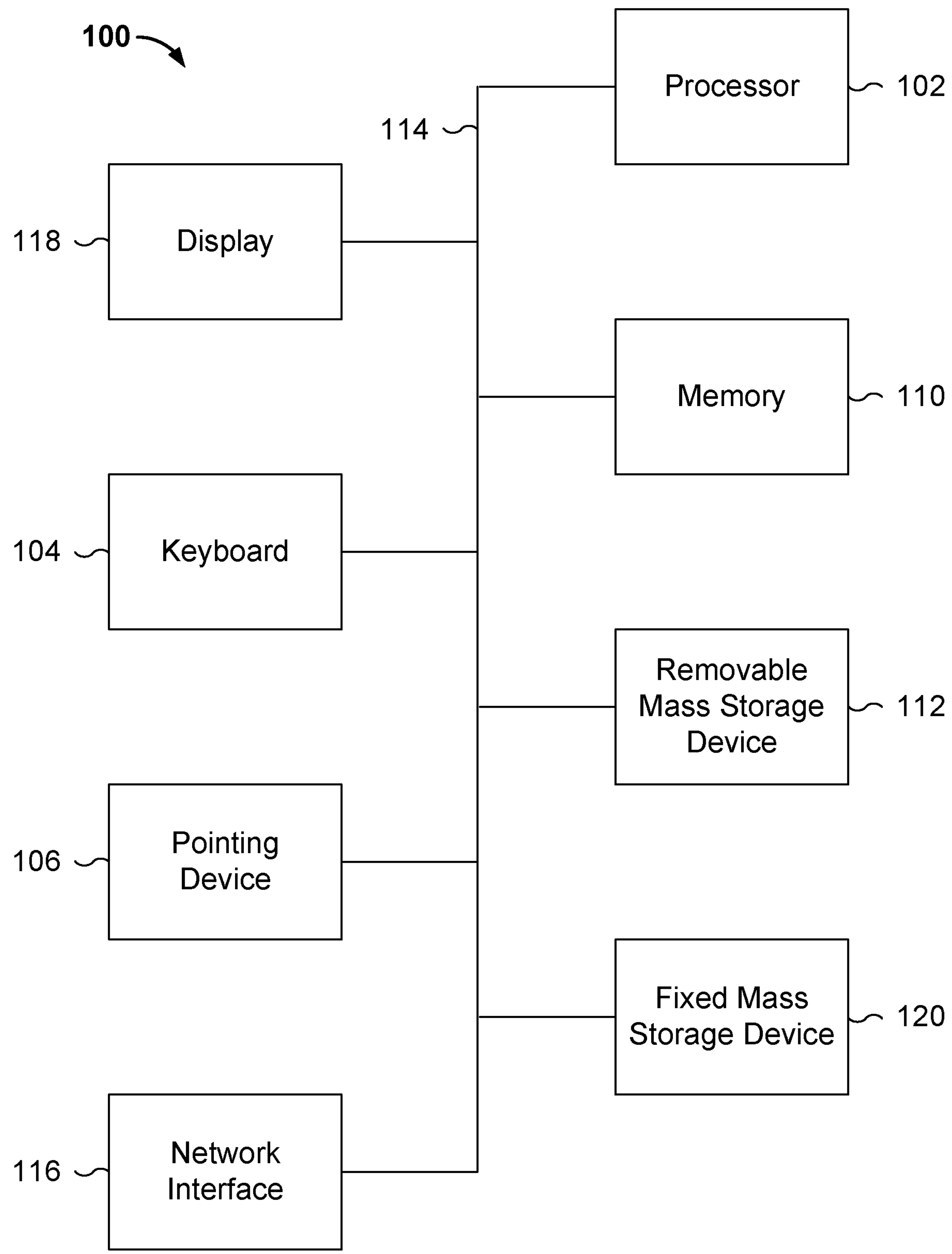
FIG. 1 is a functional diagram illustrating a programmed computer system for managing metrics in accordance with some embodiments.

FIG. 1 is a functional diagram illustrating a programmed computer system for managing metrics in accordance with some embodiments. As will be apparent, other computer system architectures and configurations can be used to manage and process metrics. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide server functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
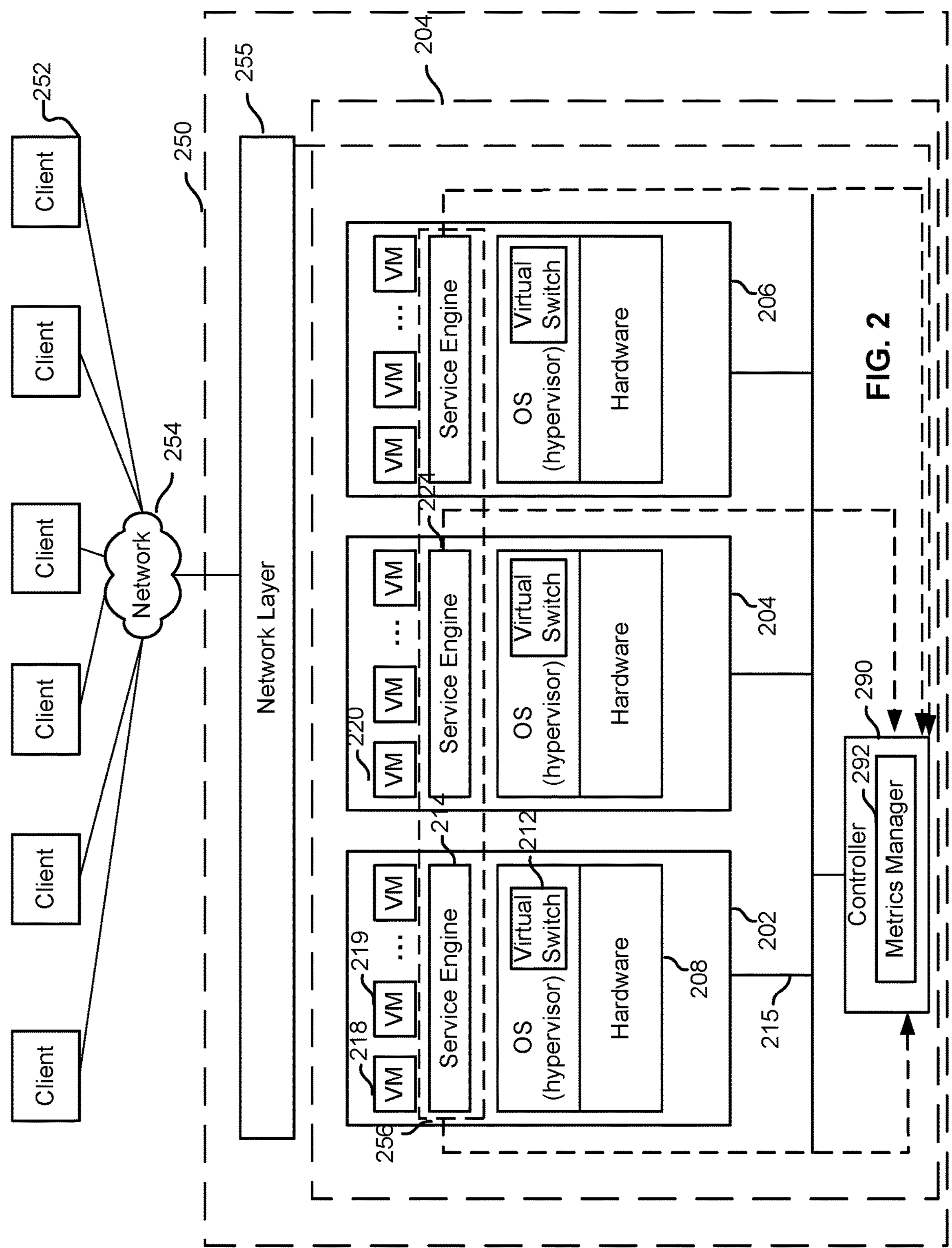
FIG. 2 is a block diagram illustrating an embodiment of a data center that includes a scalable distributed metrics manager.

FIG. 2 is a block diagram illustrating an embodiment of a data center that includes a scalable distributed metrics manager. In this example, client devices such as 252 connect to a data center 250 via a network 254. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain applications hosted by data center 250. Network 254 can be the Internet, a private network, a hybrid network, or any other communications network.

In the example shown, a networking layer 255 comprising networking devices such as routers, switches, etc. forwards requests from client devices 252 to a distributed network service platform 204. In this example, distributed network service platform 204 includes a number of servers configured to provide a distributed network service. A physical server (e.g., 202, 204, 206, etc.) has hardware components and software components, and may be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute within the VMs. Examples of such applications include web applications such as shopping cart, user authentication, credit card authentication, email, file sharing, virtual desktops, voice/video streaming, online collaboration, and many others.

One or more service engines (e.g., 214, 224, etc.) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. For example, a load balancer component is executed to provide load balancing logic to distribute traffic load amongst instances of applications executing on the local physical device as well as other physical devices; a firewall component is executed to provide firewall logic to instances of the applications on various devices; a metrics agent component is executed to gather metrics associated with traffic, performance, etc. associated with the instances of the applications, etc. Many other service components may be implemented and enabled as appropriate. When a specific service is desired, a corresponding service component is configured and invoked by the service engine to execute in a VM.

In the example shown, traffic received on a physical port of a server (e.g., a communications interface such as Ethernet port 215) is sent to a virtual switch (e.g., 212). In some embodiments, the virtual switch is configured to use an API provided by the hypervisor to intercept incoming traffic designated for the application(s) in an inline mode, and send the traffic to an appropriate service engine. In inline mode, packets are forwarded on without being replicated. As shown, the virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server. Details of the virtual switch and its operations are outside the scope of the present application.

Controller 290 is configured to control, monitor, program, and/or provision the distributed network services and virtual machines. In particular, the controller includes a metrics manager 292 configured to collect performance metrics and perform analytical operations. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

Within data center 250, one or more controllers 290 gather metrics data from various nodes operating in the data center. As used herein, a node refers to a computing element that is a source of metrics information. Examples of nodes include virtual machines, networking devices, service engines, or any other appropriate elements within the data center.

Many different types of metrics can be collected by the controller. For example, since traffic (e.g., connection requests and responses, etc.) to and from an application will pass through a corresponding service engine, metrics relating to the performance of the application and/or the VM executing the application can be directly collected by the corresponding service engine. As another example, to collect metrics relating to client responses, a service engine sends a script to a client browser or client application. The script measures client responses and returns one or more collected metrics back to the service engine. In both cases, the service engine sends the collected metrics to controller 290. Additionally, infrastructure metrics relating to the performance of other components of the service platform (e.g., metrics relating to the networking devices, metrics relating to the performance of the service engines themselves, metrics relating to the host devices such as data storage as well as operating system performance, etc.) can be collected by the controller. Specific examples of the metrics include round trip time, latency, bandwidth, number of connections, etc.

The components and arrangement of distributed network service platform 204 described above are for purposes of illustration only. The technique described herein is applicable to network service platforms having different components and/or arrangements.

Figure 3A:
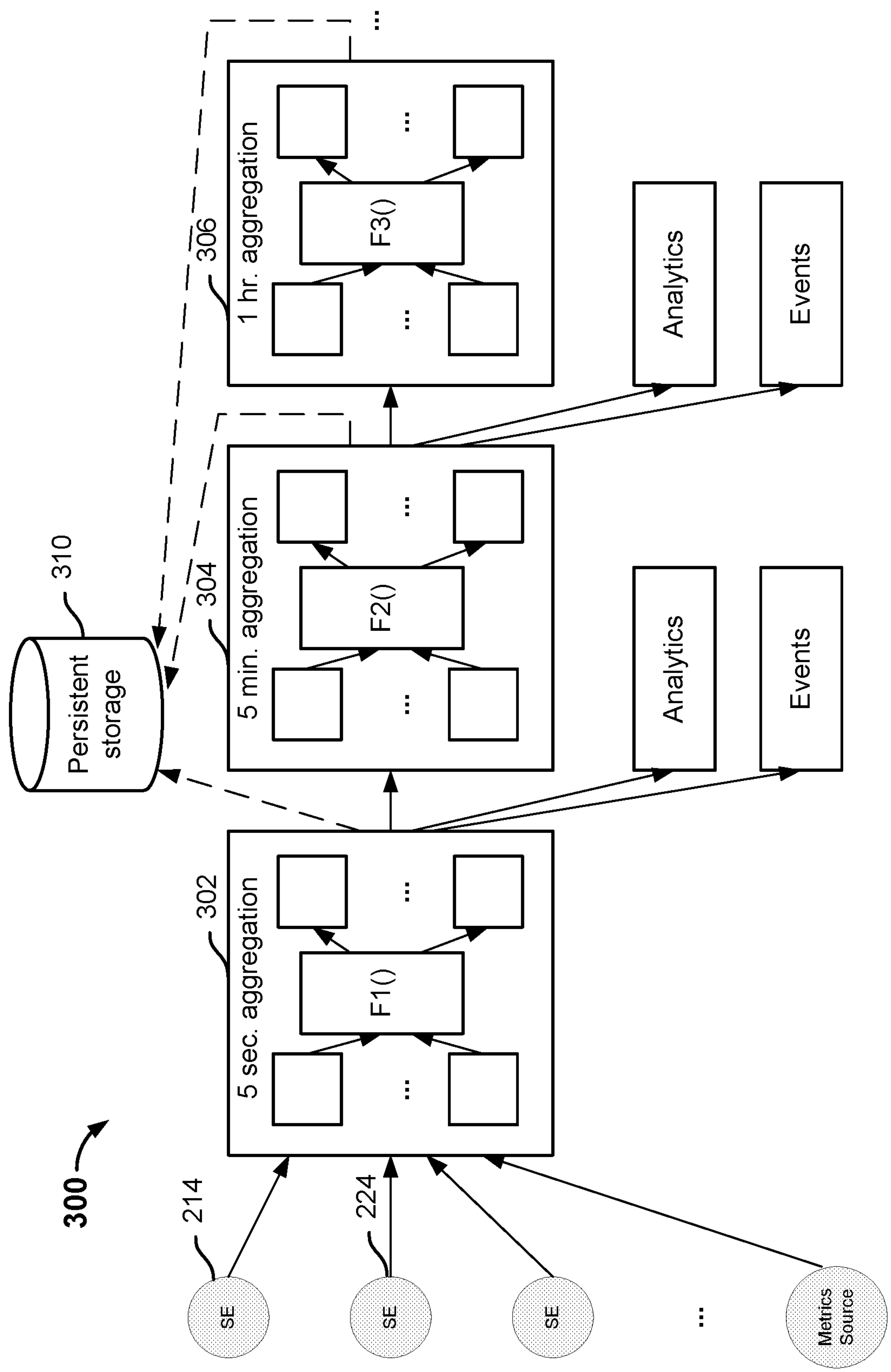
FIG. 3A is a block diagram illustrating an embodiment of a metrics pipeline in a scalable distributed metrics manager.

FIG. 3A is a block diagram illustrating an embodiment of a metrics pipeline in a scalable distributed metrics manager. Pipeline 300 implements the process for aggregating metrics and can be used to implement scalable metrics manager 292. A pipeline processes one or more specific types of metrics, and multiple pipelines similar to 300 can be configured to process different types of metrics. In this example, pipeline 300 receives metrics from a variety of sources, such as service engines 214, 224, etc., via data streams. Metrics can also be received from other sources such as network devices, an operating system, a virtual switch, etc. (not shown). The performance metrics are continuously collected at various sources (e.g., service engines, network devices, etc.) and sent to the first stage (e.g., stage 302 of FIG. 3A) of the pipeline. The rate at which a metric is generated is arbitrary and can vary for different sources. For example, one service engine can generate metrics at a rate of 1 metric/second, while another service engine can generate metrics at a rate of 2 metrics/second.

Pipeline 300 comprises multiple stages aggregating metrics at different rates. In particular, the first stage aggregates raw metrics, and each successive stage aggregates the outputs from the previous stage at a lower rate (or equivalently, a coarser granularity of time or lower frequency). In the example shown, three stages are used: stage 302 aggregates metrics from their sources every 5 seconds, stage 304 aggregates the results of stage 302 every 5 minutes, and stage 306 aggregates the results of stage 304 aggregated every hour. Different numbers of stages and/or aggregation rates can be used in other embodiments. The metrics pipeline is implemented in memory to allow for fast access and analytical operations. Each stage only needs to maintain a sufficient number of inputs (e.g., metrics or results from the previous stage) in memory to perform aggregation, thus the overall number of metrics to be stored and the total amount of memory required for real time analysis are reasonable and can be implemented for high scale environments such as enterprise data centers where large volumes of metrics are constantly generated. Note that although separate buffers are shown for the output of one stage and the input of the next stage, in some implementations only one set of buffers needs to be maintained. As will be described in greater detail below, each stage performs one or more aggregation functions to generate aggregated results. Further, each of the pipeline stages is optionally connected to a persistent storage 310, such as a database, a file system, or any other appropriate non-volatile storage system, in order to write the aggregated results to the storage and back up the metrics data more permanently. For example, MongoDB is used in some implementations. Further details of the pipeline's operations are explained in connection with FIG. 4 below.

FIG. 3B is a diagram illustrating an embodiment of a metric data structure. In this example, metric 350 is a key-tuple data structure that includes the following fields: {MetricsObjectType, Entity, Node, ObjectID}. Depending on implementation, the values in the fields can be alphanumeric strings, numerical values, or any other appropriate data formats. MetricsObjectType specifies the type of metric being sent. Examples of MetricsObjectType include client metric, front end network metric, backend network metric, application metric, etc. Entity specifies the particular element about which the metric is being reported, such as a particular server or application executing on a virtual machine. Node specifies the particular element that is reporting the metric, such as a particular service engine. An Entity may include multiple objects, and ObjectID specifies the particular object within the entity that is generating the metric, such as a particular Internet Protocol (IP) address, a particular port, a particular Universal Resource Identifier (URI), etc. In the example shown, MetricsObjectType is set to vserver_14_client (which corresponds to a type of metric related to virtual server layer 4 client), Entity is set to vs−1 (which corresponds to a server with the identifier of vs−1), Node is set to se−1 (which corresponds to a service engine with the identifier of se−1), and ObjectID is set to port (which corresponds to the port object within the server). When a metric is stored to the database, each field can be used as an index for lookups. Metrics with different fields can be defined and used. For example, in one implementation, a metric also includes a timestamp field.

In some embodiments, a source can report metrics to the metrics manager without requiring explicit registration with the metrics manager. A source can report metrics to the metrics manager by sending one or more messages having predetermined formats. FIG. 3C is a diagram illustrating an embodiment of a metrics message. The message includes a header that specifies certain characteristics of the metrics being sent (e.g., number of metrics in the message, timestamp of when the message is sent, etc.), and multiple metrics in the message body. In this example, the node batches multiple metrics in a single message and sends the message to the metrics manager.

In some implementations, the metrics manager maintains multiple pipelines to process different types of metrics. Upon receiving a metrics message, the metrics manager parses the message to obtain metrics and places each metric in an appropriate pipeline for processing. In some embodiments, upon detecting that a metric includes a new instance of key-tuples as discussed above, the metrics manager establishes a new in-memory processing unit (e.g., a specific pipeline such as 300 that is configured with its own memory, thread, and/or process for handling metrics associated with the key-tuple), and future metrics messages having the same key-tuple will be processed by this in-memory processing unit. In some embodiments, the metrics manager can establish one or more pipelines that receive as inputs multiple key-tuple in order to generate certain desired results. The configuration of specific pipelines depends on implementation.

Figure 4:
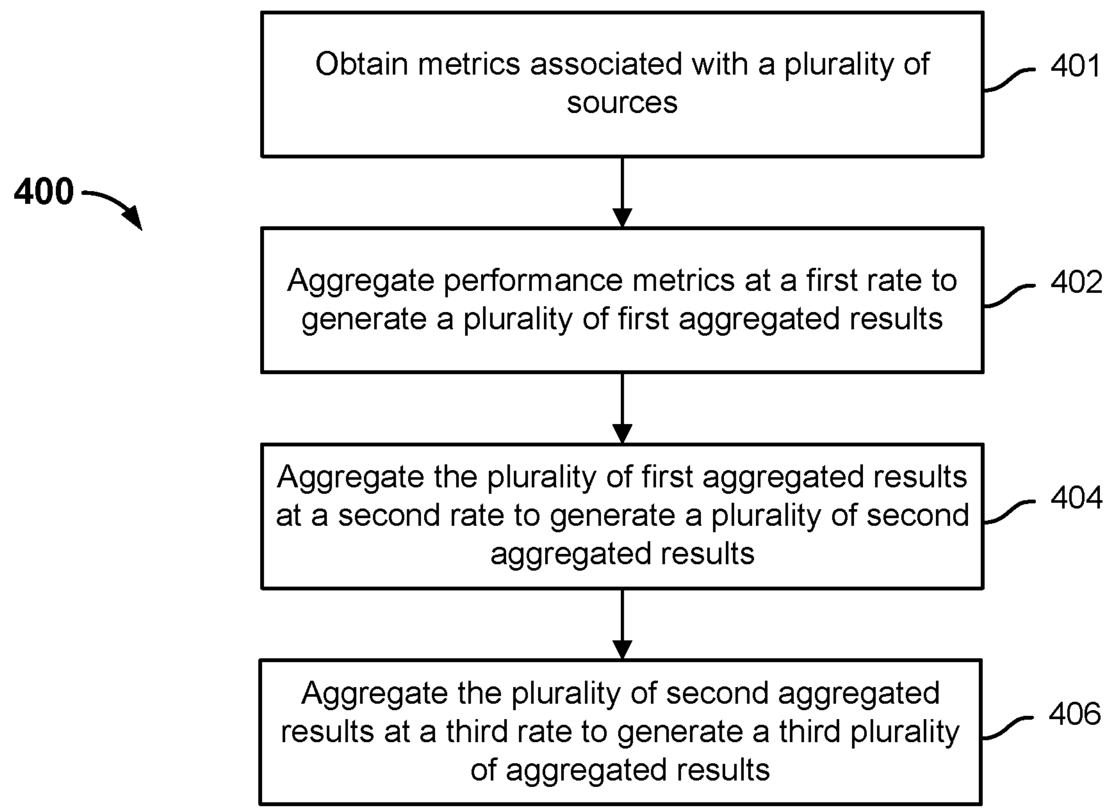
FIG. 4 is a flowchart illustrating an embodiment of a process for managing metrics.

FIG. 4 is a flowchart illustrating an embodiment of a process for managing metrics. Process 400 can be implemented by scalable metrics manager 292 operating on a system such as 100.

At 401, metrics associated with a plurality of sources are obtained. As discussed above, the metrics can be sent in messages to the metrics manager.

The obtained metrics are managed in a metrics pipeline as described above in connection with FIG. 3A.

Specifically, at 402, the metrics associated with a plurality of sources are aggregated at a first rate to generate a plurality of first aggregated results.

In some cases, aggregation includes applying one or more transform operations (also referred to as aggregation operations) that transform the received metrics to generate new metrics. For example, suppose that four instances of a particular application periodically generate a set of four metrics reporting the number of connections to each application instance. One or more aggregation functions (F1) can be performed to combine (e.g., add) the four metrics to generate a new aggregated result of the total number of connections, average the four metrics to generate a new aggregated result of average number of connections, determine the minimum and/or maximum number of connections among the four metrics, compute the difference between the maximum number of connections and the minimum number of connections, etc. Many other aggregation/transform functions are possible for various metrics manager implementations. In some cases, the raw metrics are sampled at the first rate to generate the aggregated results. More commonly, a transform operation generates a corresponding aggregated result (also referred to as derived metric) based on the inputs to the transform function. Multiple transform operations can generate a vector of aggregated results. Aggregations can be performed across service engines, across multiple servers in a pool, across multiple entities, across multiple objects, etc. A pipeline can be configured to transform any appropriate metrics into a new result. The specific aggregation functions in a pipeline can be configured by the programmer or administrator according to actual system needs.

The first rate at which aggregation takes place corresponds to the rate at which the aggregation function is performed on the collected data. In the following examples, a constant rate is discussed extensively for purposes of example, but the rate can be a non-constant rate as well (e.g., aggregation happens when the number of metrics collected meets or exceeds a threshold or when some other triggering condition for aggregation is met). Because the aggregation only uses metrics stored in memory, it does not require any database calls and is highly efficient. Further, because the aggregation is done periodically and in a batched fashion (e.g., all first stages of the pipelines perform aggregation every 5 seconds), timers do not need to be maintained per object or per metric. Thus, aggregation can be performed quickly and efficiently.

The received metrics are temporarily maintained in a memory such as a Random Access Memory (RAM). The first aggregated results and/or the received metrics will be rolled up into the next stage periodically. The first stage only needs to maintain a sufficient amount of input metrics in the memory until the first aggregation is performed, after which the metrics used in the aggregation can be removed from the memory in order to save space and make room for new aggregated results and/or metrics. Before being deleted from the memory, the first aggregated results and/or the obtained metrics are optionally output to a persistent storage such as a database. In some embodiments, the aggregation of the performance metrics and the maintenance of the first aggregated results are performed in a single process to reduce the overhead of context switches. It is permissible to implement the aggregation and the maintenance steps in separate processes.

As will be described in greater detail below, analytical operation, event detection and generation, as well as storing the aggregation results and/or the metrics to a persistent storage can be performed.

At 404, the first aggregated results are aggregated at a second rate to generate a plurality of second aggregated results. This is also referred to as a roll-up operation. In this case, the second rate (which can also be constant or non-constant) is on average lower than the first rate, and the aggregation function performed in the second stage is not necessarily the same as the aggregation function performed in the first stage. Referring again to the example shown in FIG. 3A, aggregated results of the first stage (stage 302) are sent to the second stage (stage 304), to be aggregated at a rate of every 5 minutes. Suppose that the first stage generates an aggregated result every 5 seconds, then in every 5 minutes there will be 60 first aggregated results. These 60 first aggregated results from the first stage are aggregated again at the second stage according to the one or more aggregation functions (F2) specified in the second stage to generate one or more second aggregated results.

Similar to the first aggregated results, the second aggregated results are maintained in memory for a time. A sufficient number of the second aggregated results is maintained in the memory for the third stage of aggregation to be performed. The second aggregated results are optionally output to a persistent data store. After the second aggregated results are aggregated in the third stage, those second aggregated results that are used by the third stage for aggregation can be deleted from memory to save space. One or more analytical operations can be performed on the second aggregated results. Event detection and generation can also be performed on the second aggregated results. These operations are preferably implemented as inline operations of the metrics manager.

At 406, the plurality of second aggregated results is aggregated at a third rate to generate a plurality of third aggregated results. Referring again to the example shown in FIG. 3A, the aggregation results of the second stage (stage 304) are sent to the third stage (stage 306), to be aggregated at a rate of every hour. Suppose that the second stage generates an aggregated result every 5 minutes, then in one hour there will be 12 aggregated results. These 12 aggregated results from the second stage are aggregated again at the third stage according to one or more aggregation functions (F3) associated with the third stage.

Although three stages are shown for purposes of illustration, other numbers of stages (e.g., two stages, four, or more stages) can be implemented in various embodiments.

In the above process, at each stage, the metrics manager can invoke one or more corresponding analytical operations (such as anomaly detection) on the aggregated results. For example, the Holt-Winters algorithm used to detect outlier metrics and remove anomalies can be performed at any of the stages. As another example, an aggregated result (e.g., the total number of connections) is compared with a threshold (e.g., a maximum number of 100) to detect if the threshold has been exceeded. Many analytical operations are possible and can be configured by the programmer or administrator according to actual system needs. Preferably, the analytical operation is implemented as an inline function within the metrics manager process. The inline function implements additional steps in the continuous processing of the metrics within the same process and software module. Because the aggregated results are kept in memory rather than streamed to a database and because the analytical operation is inline, the analytical operation does not require any input/output (I/O) operations such as database read/write, inter-process communication, system call, messaging, etc. Thus, the analytical operations are highly efficient compared with existing analytics tools that typically require database access or file system access. The analytical operations can be performed in real time (e.g., at substantially the same time as when the performance metrics are received, or at substantially the same time as when the aggregated results are generated).

In some embodiments, the metrics manager generates events when metrics and/or aggregated results meet certain conditions. Event detection and generation can be implemented as an inline function where certain conditions are tested on a per metric type, per entity, and per node basis. For example, if the network connections metrics of a server sent by a service engine indicate that the connection exceeds a threshold, then an event such as an alarm or log is triggered. Other examples of event triggering conditions include: a metric meeting or exceeding a high watermark level for the first time after the metric has stayed below a low threshold; a metric meeting or falling below a low watermark level after the metric has stayed above the threshold; a metric crossing a predefined threshold; a metric indicating that an anomaly has occurred, etc. Many conditions are possible, and in some embodiments, a set of rules is specified for these conditions, and a rules processing engine compares the values associated with metrics against the rules to detect whether any specified conditions are met.

As discussed above, in some implementations metrics and aggregated results are recorded in a persistent storage such as a database for backup purposes. A retention policy is specified by the administrator to determine the amount of time for which corresponding stored data remains in the database. When the retention period is over, any data that is outside the retention policy period is erased from the database to conserve space.

FIGS. 5A-5B are diagrams illustrating an embodiment of an approach for archiving the aggregated results. In this example, aggregated results are written to the database at the time of aggregation, as shown in FIG. 5A. The retention policy periods for the first stage, the second stage, and the third stage are 2 hours, 2 days, and 1 year, respectively. Thus, after 2 hours, the database records corresponding to the first aggregated results that occurred before the current two hour window are deleted from the database, as shown in FIG. 5B. As can be seen, because the data from different stages is interspersed, deleting records associated with a particular stage can leave "holes" in the database and will slow down the query of the aggregated results, negatively impacting the database's write performance, and ultimately degrading the rate of aggregation.

Figure 6A:
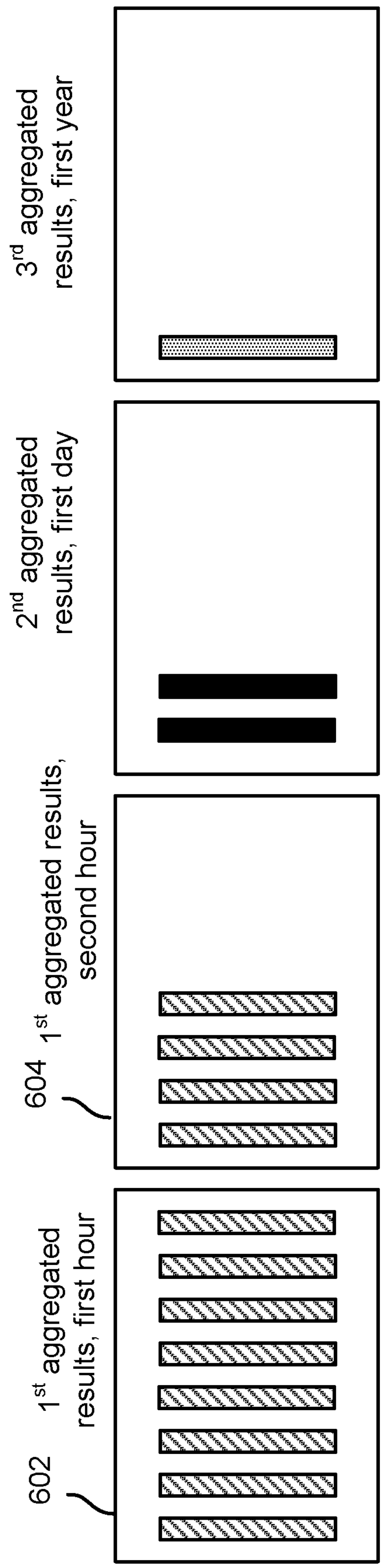
FIGS. 6A-6B are diagrams illustrating another embodiment of an approach for archiving the aggregated results.
Figure 6B:
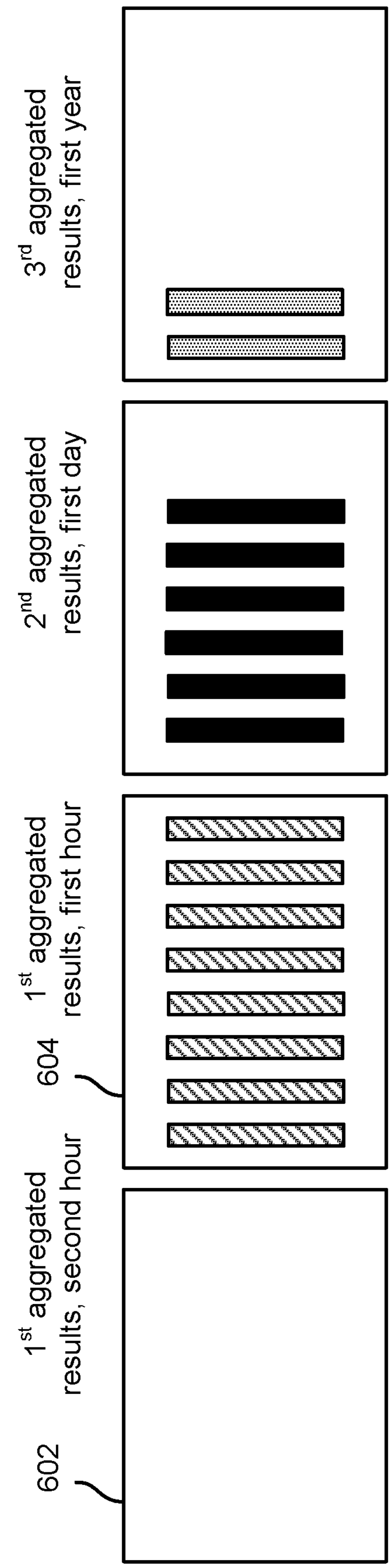

To overcome the problem illustrated in FIGS. 5A-5B, time series based database tables are used in some embodiments. FIGS. 6A-6B are diagrams illustrating another embodiment of an approach for archiving the aggregated results. In this example, aggregated results from different stages of a pipeline occupy separate tables. Within a stage, multiple tables can be used to store the aggregated results. These tables are referred to as time series based database tables since they each correspond to a different period of aggregated results. Different time series based database tables can be subject to different retention policies. In this example, two tables are used to store the first aggregated results, where each table is configured to store one hour's worth of first aggregated results from the first stage; one table is used to store the second aggregated results, where the table is configured to store one day's worth of second aggregated results from the second stage; and one table is used to store the third aggregated results, where the table is configured to store one year's worth of third aggregated results from the third stage.

The aggregated results are written to the database in a batch in append mode. For example, the first aggregated results can be written to the database every 30 minutes rather than every five seconds. Maintaining a greater amount of aggregated results in memory permits less frequent database writes, which is more efficient. Thus, the rate at which the aggregated results are written can be configured based on tradeoffs of memory required to keep the aggregated results and efficiency of database writes. Further, the aggregated results are written to the database in tables according to the retention period of the corresponding retention policy.

Note that the table size does not need to exactly correspond to the amount of data generated during the retention period but can be on the same order of magnitude. Suppose the retention period for the first stage is two hours. Table 602 is initially filled with first aggregated results obtained during the first hour, and table 604 is initially filled with first aggregated results obtained during the second hour. In this example, at the end of two hours, some of the old aggregated results need to be removed to make room for new aggregated results. Thus, for data in the next two hour window, the entire contents of table 602 is deleted, and table 604 now stores aggregated data for the first hour, and table 602 is used to store aggregated data for the second hour. Because aggregated results are stored in separate tables and deleted separately, holes in the database are avoided.

Because the database uses the time series based database tables used to store aggregated results, when the database is queried, the query will not necessarily be performed on a single table. Thus, in some embodiments, the metric manager provides a query application programming interface (API) that hides the details of the underlying time series based database table and gives the appearance of making query to and receiving results from a single table.

Figure 7:
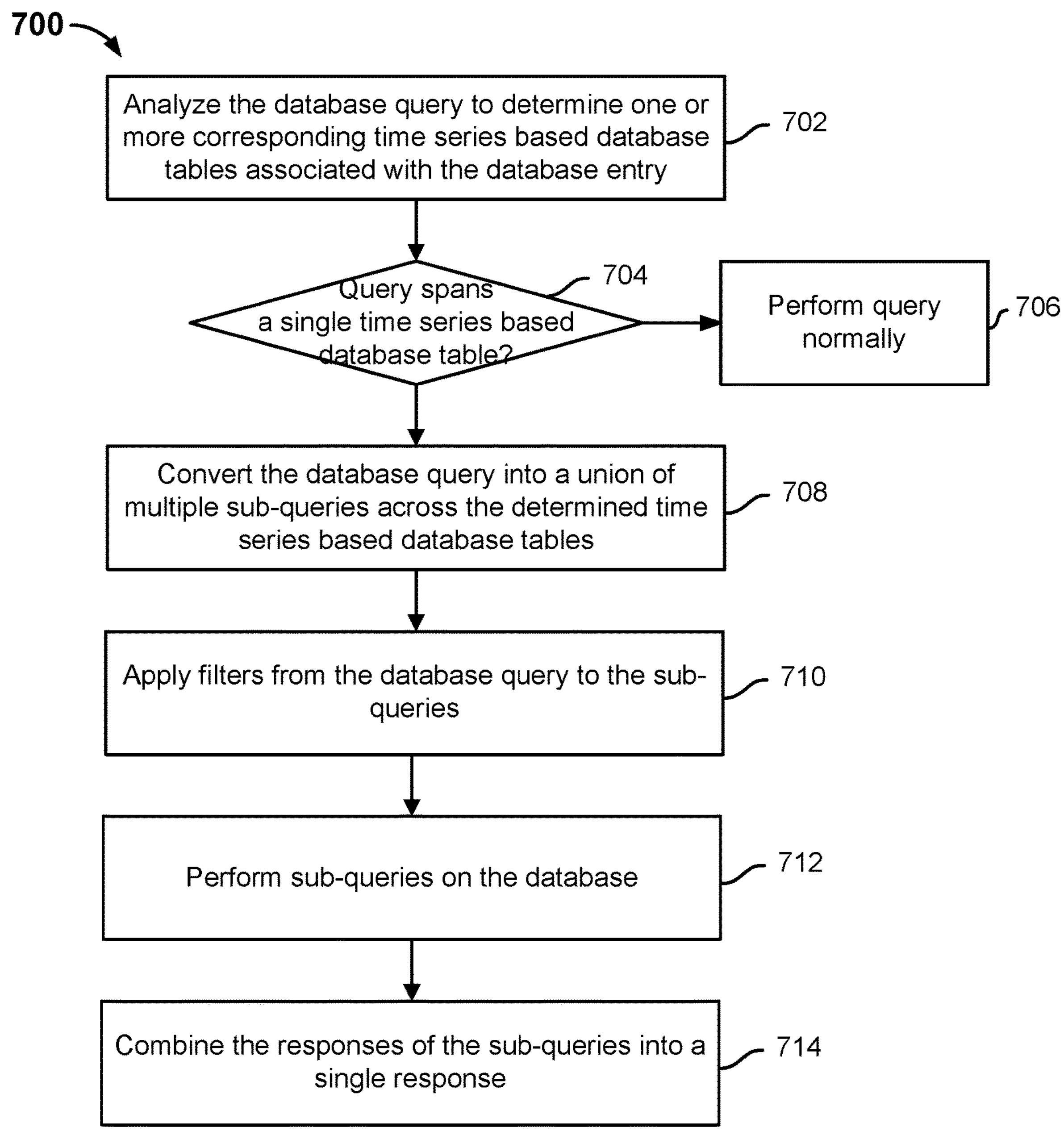
FIG. 7 is a flowchart illustrating an embodiment of a process for querying metrics data stored in a database.

FIG. 7 is a flowchart illustrating an embodiment of a process for querying metrics data stored in a database. Process 700 can be performed by the metrics manager in response to a database query, which can be initiated manually by a user via a user interface tool provided by a performance monitoring application, automatically by the performance monitoring application, etc.

At 702, the database query is analyzed to determine one or more corresponding time series based database tables associated with the database query. Specifically, the time window of the query is compared with the time windows of the time series based database tables.

At 704, it is determined whether the time window being queried spans only a single time series based database table. If so, the database query is performed normally without changes to the query, at 706. If, however, the time window being queried spans multiple time series based database tables, then the particular time series based database tables are determined and the process continues at 708.

At 708, the database query is converted into a union of multiple sub-queries across the determined time series based database tables.

At 710, filters from the database query are applied to the sub-queries such that the database's efficient filtering can be used optimally. The efficiency of filtering is gained as filters are applied on a per table basis before the results are joined together. Thus, the time complexity of filtering becomes K (the max number of rows in any table) instead of N (the number of combined rows across tables), where K<<N.

At 712, the sub-queries are performed on the database.

At 714, the responses to the sub-queries are combined into a single response.

This way, to the generator of the query (e.g., the performance monitoring application), it appears as if the query were performed on a single table.

Figure 8:
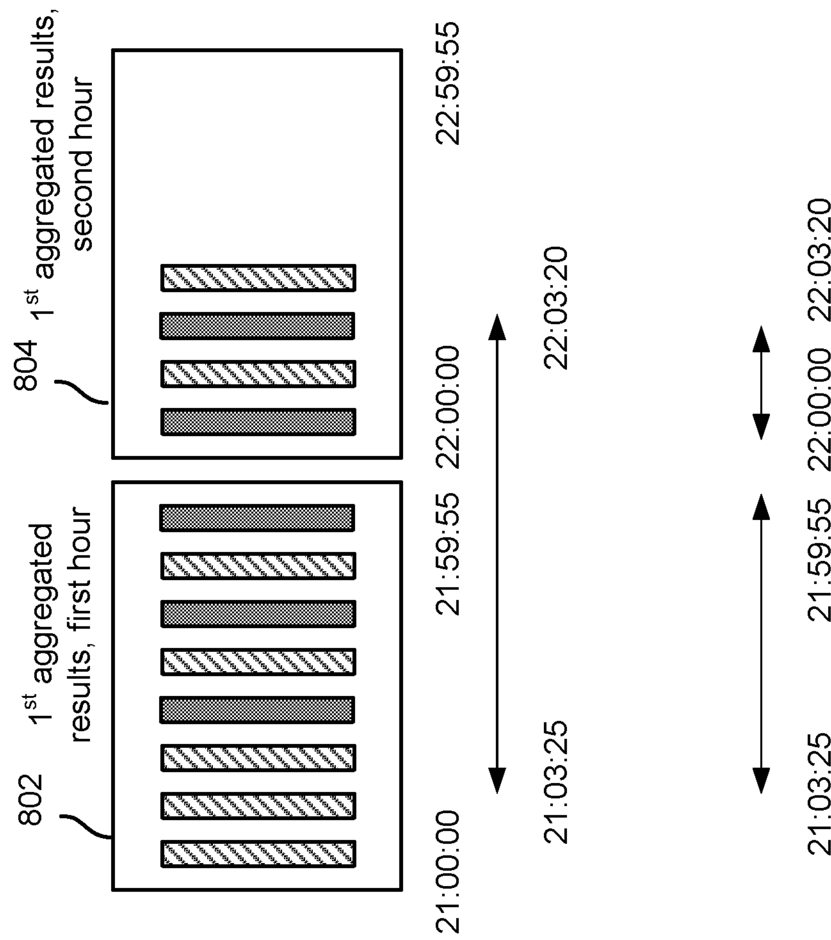
FIG. 8 is a diagram illustrating an example of a query to a database comprising multiple time series based database tables.

FIG. 8 is a diagram illustrating an example of a query to a database comprising multiple time series based database tables. In FIG. 8, a plurality of database tables is used to store aggregated metrics from various stages of the pipeline. In particular, tables 802 and 804 are shown to store the first hour of the first aggregated results and the second hour of the first aggregated results, respectively. As shown, table 802 stores metrics gathered between 21:00:00-22:59:55 and table 804 stores metrics gathered between 22:00:00-22:59:55. Metrics in both tables are gathered in 5-second increments.

Suppose the following database query is made to query the database:

SELECT se_stats_table.metric_timestamp AS se_stats_table_metric_timestamp,
se_stats_table.avg_cpu_usage AS se_stats_table_avg_cpu_usage, entity_table.entity_id AS entity_id
FROM se_stats_table JOIN entity_table ON entity_table.entity_key=se_stats_table.entity_key
WHERE se_stats_table.metric_timestamp>='2015-03-19T21:03:25' AND
se_stats_table.metric_timestamp<='2015-03-19T22:03:20'
AND se_stats_table.metric_period='5SECOND' AND entity_table.entity_id='se-1'

Referring to FIG. 7, at 702, the database query is analyzed and it is determined that there are two time series based database tables (802 and 804) that correspond to the database query.

At 708 and 710, the database query is converted into a union of two sub-queries, and filters are applied to the sub-queries. In this example, the sub-queries correspond to their respective database tables. The sub-query that spans the time window of '2015-03-19T21:03:25' to '2015-03-19T21:59:55' is:

SELECT se_stats_table_1hour_396333.metric_timestamp AS
se_stats_table_1hour_396333_metric_timestamp,
se_stats_table_1hour_396333.avg_cpu_usage
AS se_stats_table_1hour_396333_avg_cpu_usage, entity_table.entity_id AS entity_id
FROM se_stats_table_1hour_396333 JOIN entity_table ON entity_table.entity_key=
se_stats_table_1hour_396333.entity_key
WHERE
se_stats_table_1hour_396333.metric_timestamp>='2015-03-19T21:03:25' AND se_stats_table_1hour_396333.metric_timestamp ‘2015-03-19T21:59:55’ AND
se_stats_table_1hour_396333.metric_period=‘5SECOND’
AND entity_table.entity_id=‘se−1’

The sub-query that spans the time window of 2015-03-19T22:00:00 to ‘2015-03-19T22:03:20’ is:

SELECT se_stats_table_1hour 396334.metric_timestamp AS
se_stats_table_1hour_396334_metric_timestamp,
se_stats_table_1hour_396334.avg_cpu_usage
AS se_stats_table_1hour_396334 avg_cpu_usage, entity_table.entity_id AS entity_id
FROM se_stats_table_1hour_396334 JOIN entity_table ON
entity_table.entity_key=
se_stats_table_1hour_396334.entity_key
WHERE
se_stats_table_1hour_396334.metric_timestamp>=‘2015-03-19T22:00:00’ AND
se_stats_table_1hour_396334.metric_timestamp ‘2015-03-19T22:03:20’ AND
se_stats_table_1hour_396334.metric_period=‘5SECOND’
AND entity_table.entity_id=‘se−1’

The union of the sub-queries with filters is:

SELECT anon 1.se_stats_table_1hour_396333 metric_timestamp AS metric_timestamp,
anon_1.se_stats_table_1hour_396333 avg_cpu_usage AS avg_cpu_usage, anon_1.entity_id AS
entity_id
FROM (SELECT
se_stats_table_1hour_396333.metric_timestamp AS
se_stats_table_1hour_396333 metric_timestamp,
se_stats_table_1hour_396333.avg_cpu_usage
AS se_stats_table_1hour_396333 avg_cpu_usage, entity_table.entity_id AS entity_id
FROM se_stats_table_1hour_396333 JOIN entity_table ON
entity_table.entity_key=se_stats_table_1hour_396333.
entity_key
WHERE
se_stats_table_1hour_396333.metric_timestamp>=‘2015-03-19T21:03:25’ AND
se_stats_table_1hour_396333.metric_timestamp<=‘2015-03-19T21:59:55’ AND
se_stats_table_1hour_396333.metric_period=‘5SECOND’
AND entity_table.entity_id=‘se−1’
UNION ALL SELECT
se_stats_table_1hour_396334.metric_timestamp AS
se_stats_table_1hour_396334 metric_timestamp,
se_stats_table_1hour_396334.avg_cpu_usage
AS se_stats_table_1hour_396334 avg_cpu_usage, entity_table.entity_id AS entity_id
FROM se_stats_table_1hour_396334 JOIN entity_table ON
entity_table.entity_key=se_stats_table_1hour_396334.
entity_key
WHERE
se_stats_table_1hour_396334.metric_timestamp>=‘2015-03-19T22:00:00’ AND
se_stats_table_1hour_396334.metric_timestamp ‘2015-03-19T22:03:20’ AND
se_stats_table_1hour_396334.metric_period=‘5SECOND’
AND entity_table.entity_id=‘se−1’)
AS anon_1
ORDER BY anon_1.se_stats_table_1hour_396333
metric_timestamp
LIMIT 720

The rearrangement of the query across multiple time series tables shown above does not compromise the performance of read operations to the database, and facilitates efficient write operations to the database by the metrics manager.

Managing performance metrics has been disclosed. By processing the metrics in a pipeline in memory, the technique described above significantly reduces the amount of I/O operations and latency associated with processing the metrics, and allows for real time analytics.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of producing aggregated performance metric sets associated with a set of elements in a network, the method comprising:

iteratively;

(i) storing a plurality of performance metric sets, associated with the set of network elements, in a memory until a first threshold amount of storage is reached; and (ii) upon reaching the first threshold amount, performing a first aggregation operation on the performance metric sets stored in a particular iteration to generate an aggregate performance metric set that is at a first aggregation level;

storing a plurality of aggregate performance metric sets generated by a plurality of iterations at the first aggregation level in the memory until a second threshold amount of storage is reached; and upon reaching the second threshold amount, performing a second aggregation operation on the plurality of aggregate performance metric sets at the first aggregation level to generate an aggregate performance metric set at a second aggregation level, said first and second aggregation operations performed to reduce an amount of memory consumed while producing aggregated performance metric sets for a set of analytical tools to analyze.

2. The method of claim 1 further comprising:

iteratively;

storing a plurality of aggregate performance metric sets generated by a plurality of second aggregation operations at the second aggregation level in the memory until a third threshold amount of storage is reached; and upon reaching the third threshold amount, performing a third aggregation operation on the plurality of aggregate performance metric sets at the second aggregation level to generate an aggregate performance metric set at a third aggregation level.

3. The method of claim 2 further comprising outputting at least one of (1) the plurality of aggregate performance metric sets at the second aggregation level and (2) the aggregate performance metric set at the third aggregation level to a persistent storage.

4. The method of claim 1 further comprising performing a first set of analytical operations based at least in part on the plurality of aggregate performance metric sets at the first aggregation level to detect anomalies in the plurality of aggregate performance metric sets at the first aggregation level.

5. The method of claim 1, wherein the first aggregation operation comprises one or more of:

averaging values associated with a first performance metric in the plurality of performance metric sets;

determining a maximum of a set of values associated with a second performance metric in the plurality of performance metric sets;

determining a minimum of a set of values associated with a third performance metric in the plurality of performance metric sets; and calculating a difference between a maximum and minimum value associated with a fourth performance metric in the plurality of performance metric sets.

6. The method of claim 1, wherein the set of network elements comprises a plurality of compute nodes executing on a plurality of host computers and the plurality of performance metric sets is received from a plurality of service engines executing on the plurality of host computers to provide a distributed network service to the plurality of compute nodes.

7. The method of claim 1 further comprising:

performing a first set of analytical operations based at least in part on the plurality of aggregate performance metric sets at the first aggregation level to detect anomalies in the plurality of aggregate performance metric sets at the first aggregation level; and performing a second set of analytical operations based at least in part on the aggregate performance metric set at the second aggregation level to detect anomalies in the aggregate performance metric set at the second aggregation level.

8. The method of claim 1, wherein the plurality of aggregate performance metric sets at the first aggregation level are removed from the memory after the plurality of aggregate performance metric sets defined at the first aggregation level are aggregated into the aggregate performance metric set at the second aggregation level.

9. The method of claim 1 further comprising performing event detection based on one or more of: the plurality of performance metric sets, the generated aggregate performance metric sets at the first aggregation level, and the aggregate performance metric set at the second aggregation level.

10. The method of claim 1 further comprising, after the first aggregation operation on the performance metric sets stored in the particular iteration, removing the plurality of performance metric sets stored in the particular iteration from the memory.

11. The method of claim 1, wherein at least one of (1) the plurality of aggregate performance metric sets at the first aggregation level and (2) the aggregate performance metric set at the second aggregation level are persisted to a persistent storage.

12. The method of claim 1, wherein:

the plurality of aggregate performance metric sets at the first aggregation level are persisted to one or more first time-series-based database tables in a persistent storage;

a plurality of generated aggregate performance metric sets at the second aggregation level are persisted to one or more second time-series-based database tables in the persistent storage;

the one or more first time-series-based database tables are separate from the one or more second time-series-based database tables;

data stored in the one or more first time-series-based database tables is subject to a first retention period; and data stored in the one or more second time-series-based database tables is subject to a second retention period that is different from the first retention period.

13. The method of claim 12 further comprising:

analyzing a database query to determine whether there are a plurality of corresponding time-series-based database tables associated with the database query;

in the event that there are a plurality of corresponding time-series-based database tables associated with the database query, converting the database query into a union of a plurality of sub-queries across the plurality of corresponding time-series-based database tables associated with the database query;

applying any filters from the database query to the sub-queries;

performing the plurality of sub-queries; and combining responses to the plurality of sub-queries into one response to the database query.

14. A system, comprising:

a set of one or more processors;

one or more memories coupled to the one or more processors; and a non-transitory machine readable medium storing a program for execution by the set of processors, the program for producing aggregated performance metric sets associated with a set of elements in a network, the program comprising sets of instructions for:

iteratively;

(i) storing a plurality of performance metric sets, associated with the set of network elements, in a memory of the one or more memories until a first threshold amount of storage is reached; and (ii) upon reaching the first threshold amount, performing a first aggregation operation on the performance metric sets stored in a particular iteration to generate an aggregate performance metric set that is at a first aggregation level;

storing a plurality of aggregate performance metric sets generated by a plurality of iterations at the first aggregation level in the memory until a second threshold amount of storage is reached; and upon reaching the second threshold amount, performing a second aggregation operation on the plurality of aggregate performance metric sets at the first aggregation level to generate an aggregate performance metric set at a second aggregation level, said first and second aggregation operations performed to reduce an amount of memory consumed while producing aggregated performance metric sets for a set of analytical tools to analyze.

15. The system of claim 14, wherein the program further comprises a set of instructions for:

iteratively storing a plurality of aggregate performance metric sets generated by a plurality of second aggregation operations at the second aggregation level in the memory until a third threshold amount of storage is reached; and upon reaching the third threshold amount, performing a third aggregation operation on the plurality of aggregate performance metric sets at the second aggregation level to generate an aggregate performance metric set at a third aggregation level.

16. The system of claim 14, wherein the program further comprises a set of instructions for outputting at least one of (1) the plurality of aggregate performance metric sets at the first aggregation level, and the aggregate performance metric set at the second aggregation level are persisted to a persistent storage.

17. The system of claim 14, wherein the first aggregation operation comprises one or more of:

averaging values associated with a first performance metric in the plurality of performance metric sets;

determining a maximum of a set of values associated with a second performance metric in the plurality of performance metric sets;

determining a minimum of a set of values associated with a third performance metric in the plurality of performance metric sets; and calculating a difference between a maximum and minimum value associated with a fourth performance metric in the plurality of performance metric sets.

18. The system of claim 14, wherein the plurality of aggregate performance metric sets at the first aggregation level are removed from the memory after the plurality of aggregate performance metric sets at the first aggregation level are aggregated into the aggregate performance metric set at the second aggregation level.

19. A non-transitory computer readable medium storing a program for execution by the set of processors, the program for producing aggregated performance metrics associated with a set of elements in a network, the program comprising sets of instructions for:

iteratively;

(i) storing a plurality of performance metric sets, associated with the set of network elements, in a memory until a first threshold amount of storage is reached; and (ii) upon reaching the first threshold amount, performing a first aggregation operation on the performance metric sets stored in a particular iteration to generate an aggregate performance metric set that is at a first aggregation level;

storing a plurality of aggregate performance metric sets generated by a plurality of iterations at the first aggregation level in the memory until a second threshold amount of storage is reached; and upon reaching the second threshold amount, performing a second aggregation operation on the plurality of aggregate performance metric sets at the first aggregation level to generate an aggregate performance metric set at a second aggregation level, said first and second aggregation operations performed to reduce an amount of memory consumed while producing aggregated performance metric sets for a set of analytical tools to analyze.

20. The non-transitory machine readable medium of claim 19, wherein the set of network elements comprises a plurality of compute nodes executing on a plurality of host computers and the plurality of performance metrics is received from a plurality of service engines executing on the plurality of host computers to provide a distributed network service to the plurality of compute nodes.

* * * * *